United States Patent Office 3,370,061
Patented Feb. 20, 1968

3,370,061
11-AMINO-10,11-DIHYDRO-5H-DIBENZO[a,d]
CYCLOHEPTEN-10-ONES
Gerardus J. B. Corts, Haarlem, Netherlands, assignor to N.V. Koninklijke Pharmaceutische Fabrieken v/h Brocades Stheeman en Pharmacie, Amsterdam, Netherlands, a corporation of the Netherlands
No Drawing. Filed May 17, 1965, Ser. No. 456,518
Claims priority, application Great Britain, Sept. 29, 1964, 39,675/64
4 Claims. (Cl. 260—247.7)

This invention relates to new therapeutically useful dibenzocycloheptenyl-amines and their acid-addition salts, to processes for their preparation and to pharmaceutical preparations containing them.

According to the present invention, there are provided the new 10,11-dihydro-5H-dibenzocycloheptenyl-amines of the general formula

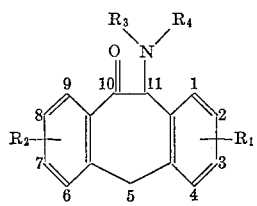

wherein $R_1$ and $R_2$ are the same or different and each represents hydrogen, halide or lower alkyl, $R_3$ and $R_4$ are the same or different and each represents hydrogen or lower alkyl, and $R_3$ and $R_4$ together with the nitrogen atom to which they are attached represent a saturated, mono-nuclear heterocyclic group which may include a second hetero atom, for example, nitrogen, oxygen, or sulphur and acid-addition salts thereof. Examples of heterocyclic groups which the grouping —$NR_3R_4$ may represent are pyrrolidino, piperidino, morpholino, thiamorpholino, piperazino, 4-lower alkyl-piperazino and 4-aryl(lower)alkylpiperazino. The term "lower alkyl," as employed in this specification, means straight and branched chain alkyl radicals of from one to eight carbons, preferably from one to six carbons.

The aforesaid dibenzocycloheptenyl-amines are therapeutically active compounds which are utilizable as sedatives. When used for therapeutic purposes, they may be employed as such or in the form of non-toxic acid-addition salts, i.e., salts which are not harmful to the animal organism when used in therapeutic doses. Such salts may be derived from inorganic acids, such as the hydrohalic acids (e.g., hydrochloric, hydrobromic acid and so forth), sulphuric acid, nitric acid and phosphoric acid, and organic acids such as oxalic, maleic, tartaric, citric, acetic, lactic, succinic, fumaric and pamoic acids. The preferred compounds of the invention are those wherein the grouping —$NR_3R_4$ is a dialkylamino or heterocyclic group, $R_1$ is in the 3-position and represents hydrogen, chlorine or methyl, and $R_2$ represents hydrogen; in particular, 11 - morpholino-10,11-dihydro-5H-dibenzo[a,d]cyclohepten-10-one and non-toxic acid-addition salts thereof.

According to a feature of the invention, the compounds of Formula I are prepared by the reaction of a compound of the formula

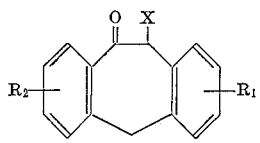

(wherein X represents a halide, preferably chlorine or bromine, and $R_1$ and $R_2$ are as hereinbefore defined) with ammonia or an amine of the formula

wherein $R_3$ and $R_4$ are as hereinbefore defined. The reaction can be carried out by heating the reactants in the absence or presence of an inert organic solvent, e.g., benzene, toluene or xylene. To obtain the compounds of Formula I directly in the form of the free base an appropriate amount of an acid-binding agent such as an alkali metal (in particular, sodium or potassium) amide, carbonate, oxide or bicarbonate must be added to the reactants, or alternatively, an excess of the amine may be used for the same purpose.

The halogeno-ketone compounds of Formula II can be obtained by halogenating in the 11-position a 10,11-dihydro-5H-dibenzocycloheptenone of the formula

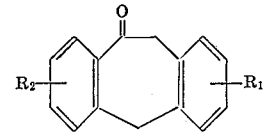

The halogenation is suitably effected by adding the halogen to a solution of the dibenzocycloheptenone in an inert organic solvent, for example, carbon tetrachloride, irradiated with ultraviolet light.

Examples of ketones of Formula IV which may be used as starting materials are 10,11-dihydro-5H-dibenzo[a,d]cyclohepten-10-one; 1,2,3- and 4-chloro-10,11-dihydro-5H-dibenzo[a,d]cyclohepten-10-one; 1,2,3- and 4-bromo-10,11-dihydro - 5H - dibenzo[a,d]cyclohepten-10-one; 1,2,3- and 4-methyl-10,11-dihydro-5H-dibenzo[a,d]cyclohepten-10-one; 1,2,3- and 4-ethyl-10,11-dihydro-5H-dibenzo[a,d]cyclohepten-10,one; 1,2,3- and 4-isopropyl-10,11-dihydro-5H-dibenzo[a,d]cyclohepten-10-one; 1,2,3- and 4-t.-butyl-10,11-dihydro - 5H - dibenzo[a,d]cyclohepten-10-one; 3,9-, 1,7- and 3,7-dimethyl-10,11-dihydro-5H-dibenzo[a,d]cyclohepten-10-one. The ketone starting materials can be prepared according to the procedures described in the specification of our copending U.S. patent application No. 385,488, filed July 27, 1964.

According to a further feature of the invention, the dibenzocycloheptenyl-amines of Formula I in which the grouping —$NR_3R_4$— is primary amino are prepared by the process which comprises reducing the =NOH group of an oxime of the formula

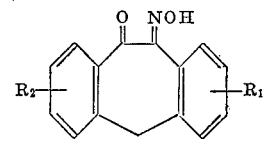

(wherein $R_1$ and $R_2$ are as hereinbefore defined) to a primary amino group by known methods such as with lithium aluminium hydride. In order to prevent concomitant reduction of the keto group, that group is best protected initially by the formation of a ketal grouping by reaction with a diol, preferably ethylene glycol, and reduction of the oxime group to amino is carried out with the starting material of Formula V in an alkaline medium, preferably with lithium aluminium hydride as the reducing agent. After the reduction, the reaction mixture is acidified to free the keto group by splitting off the diol.

The starting materials of Formula V can be obtained by treating a dibenzocycloheptenone of Formula IV with, for example, isoamylnitrite.

According to another feature of the invention, 10,11-dihydro-5H-dibenzo[a,d]cycloheptenyl-amines of Formula I, in which $R_3$ represents hydrogen or alkyl, and $R_4$ represents alkyl, are prepared from the corresponding amino. In the case where $R_3$ and $R_4$ are both alkyl, the alkylamino compounds prepared by the process described above may be alkylated. Alkylation of the amino or alkylamino group may be carried out, for example, using an alkyl ester as a reagent or the reaction may be carried out with an acid halide and reduction of the carbonyl group in the resulting amide to a methylene group (e.g., with lithium aluminium hydride using a solvent medium such as diethyl ether or tetrahydrofuran). In the case of alkylation of a primary amino group, the reaction may be carried out with an aldehyde (e.g., formaldehyde) and hydrogen in the presence of a hydrogenation catalyst (e.g., Raney nickel). In the case of methylation, the reaction proceeds to completion utilizing formaldehyde and formic acid.

The compounds of the invention, when prepared by the aforementioned processes in the form of their free bases, can be converted into corresponding acid-addition salts by dissolving the free base in an inert organic solvent and adding a solution of the desired acid, preferably in the same or in a homogenously miscible solvent, and causing the salt to precipitate.

The following examples, in which the temperatures mentioned are in degrees centigrade unless otherwise stated, illustrate the preparation of 10,11-dihydro-5H-dibenzocycloheptenyl-amines of the present invention.

*Example 1*

(a) A solution of 11.5 g. of 11-bromo-10,11-dihydro-5H-dibenzo[a,d]cyclohepten-10-one in 300 ml. of anhydrous benzene is mixed with a solution of 10.5 g. of morpholine in 50 ml. of anhydrous benzene. A precipitate of morpholine hydrobromide is slowly formed. The mixture is left standing overnight at room temperature, and then 100 ml. of water is added. The benzene solution is separated, washed with water and extracted with a 2 N hydrogen chloride solution which contains some ethanol in order to increase the solubility of 11-morpholino-10,11-dihydro-5H-dibenzo[a,d]cyclohepten-10-one and its hydrochloride. The base is liberated again by treatment of the aqueous solution with a sodium hydroxide solution and extracted with benzene. The benzene solution is again washed with water and dried with potassium carbonate. After filtration, a solution of hydrogen chloride in ether is added. The precipitate is filtered off, washed with ether and crystallized from a mixture of ethanol and ether. The hydrochloride of 11-morpholino-10,11-dihydro-5H-dibenzo[a,d]cyclohepten-10-one is dried over phosphorus pentoxide under reduced pressure. Melting point, 210–213°. Yield 53%.

*Analysis.*—Calc'd for $C_{19}H_{20}NO_2Cl$: C, 69.19%; H, 6.11%; N, 4.24%. Found: C, 68.90%; H, 6.20%; N, 4.09%.

(b) The dibenzocycloheptenone starting material is prepared as follows:

To an ice-cold solution of 20.8 g. of 10,11-dihydro-5H-dibenzo[a,d]cyclohepten-10-one in 280 ml. of anhydrous carbon tetrachloride there is added dropwise and with stirring a solution of 16 g. of bromine in 100 ml. of anhydrous carbon tetrachloride. The mixture is irradiated with ultraviolet light. The mixture is stirred for another 15 minutes after completion of the addition. The carbon tetrachloride is distilled off under reduced pressure, leaving crude 11-bromo-10,11-dihydro-5H-dibenzo[a,d]cyclohepten-10-one which, after crystallization from methanol, melts at 77–80°. Yield 77%.

*Example 2*

Following the procedure described in step (a) of Example 1, but substituting an equivalent amount of dimethylamine for the morpholine, the hydrochloride of 11-dimethylamino - 10,11 - dihydro-5H-dibenzo[a,d]cyclohepten-10-one is obtained in 31% yield. Melting point of the salt after crystallization from an ethanol-ether mixture is 180–185°.

*Analysis.*—Calc'd for $C_{17}H_{18}NOCl$: C, 70.94%; H, 6.31%; N, 4.86%. Found: C, 70.70%; H, 6.47%; N, 4.86%.

*Example 3*

Following the procedure of step (a) of Example 1, but substituting an equivalent amount of piperidine for the morpholine, the hydrochloride of 11-piperidino-10,11-dihydro-5H-dibenzo[a,d]cyclohepten-10-one is obtained in 50% yield. Melting point of the salt after crystallization from ethanol and ether is 197–200°.

Similarly, if monomethylamine, diethylamine, dibutylamine, pyrrolidine, N-methylpiperazine and N-benzylpiperazine are substituted for the morpholine in the procedure of Example 1, step (a), 11-N-methylamino-10,11-dihydro - 5H-dibenzo[a,d]cyclohepten-10-one; 11-N,N-diethylamino - 10,11 - dihydro-5H-dibenzo[a,d]cyclohepten-10 - one; 11-N,N-dibutylamino-10,11-dihydro-5H-dibenzo [a,d]cyclohepten - 10 - one; 11-pyrrolidino-10,11-dihydro-5H - dibenzo[a,d]cyclohepten-10-one; 11-(4-methylpiperazino) - 10,11 - dihydro - 5H-dibenzo[a,d]cyclohepten-10-one, and 11 - (4 - benzylpiperazino)-10,11-dihydro-5H-dibenzo[a,d]cyclohepten-10-one, respectively, are obtained.

Moreover, if an $R_1$ and/or $R_2$-substituted 10,11-dihydro-5H-dibenzo[a,d]cyclohepten-10-one is substituted for the 10,11-dihydro-5H-dibenzo[a,d]cyclohepten-10-one in the procedure of Example 1, the corresponding 11-morpholino-($R_1$ and/or $R_2$ substituted)-10,11-dihydro-5H-dibenzo[a,d]cyclohepten-10-one is obtained.

The invention includes within its scope pharmaceutical preparations containing, as the active ingredient, at least one of the therapeutically active compounds of general Formula I, or non-toxic acid-addition salts thereof, in association with a pharmaceutically acceptable carrier. The preparations may take any of the forms customarily employed for administration of therapeutically active substances, but the preferred types are those suitable for oral administration and especially tablets, including sustained release tablets, pills and capsules including the substance. The tablets and pills may be formulated in the usual manner with one or more pharmaceutically acceptable diluents or excipients, for example lactose or starch, and include materials of a lubricating nature, for example calcium or magnesium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e., as a suspension or emulsion in sterile water or an organic liquid usually employed for injectable preparations, for example a vegetable oil such as olive oil, or a sterile solution in an organic solvent.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:
1. A compound selected from the group having the formula

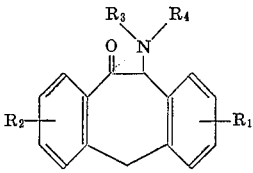

wherein $R_1$ and $R_2$ are selected from the group consisting of hydrogen, lower alkyl and halide, $R_3$ and $R_4$ are selected from the group consisting of hydrogen and lower alkyl and $R_3$ and $R_4$ together form a heterocyclic group selected from the group consisting of pyrrolidino, piperidino, morpholino, thiamorpholino, piperazino, 4-lower alkyl-piperazino and 4-phenyl-lower alkyl piperazino and salts thereof.

2. 11 - morpholino - 10,11 - dihydro - 5H-dibenzo[a,d] cyclohepten-10-one.
3. 11 - dimethylamino - 10,11-dihydro-5H-dibenzo[a,d] cyclohepten-10-one.
4. 11 - piperidino - 10,11 - dihydro - 5H - dibenzo[a,d] cyclohepten-10-one.

References Cited
UNITED STATES PATENTS
2,916,490  12/1959  Schenck et al. _____ 260—247

OTHER REFERENCES
Rigaudy et al., Société Chimique de France Bulletin Ser. 5, January–June, pages 638–642, 1959.

ALEX MAZEL, *Primary Examiner.*

J. TOVAR, *Assistant Examiner.*